United States Patent
Agehara et al.

(10) Patent No.: US 7,241,087 B2
(45) Date of Patent: Jul. 10, 2007

(54) CORE BIT

(75) Inventors: Kigen Agehara, Tokyo (JP); Michio Yamashita, Tokyo (JP); Naohide Murakami, Tokyo (JP)

(73) Assignee: Max Co., Ltd., Tokyo (JP)

( * ) Notice: Subject to any disclaimer, the term of this patent is extended or adjusted under 35 U.S.C. 154(b) by 5 days.

(21) Appl. No.: 10/528,234

(22) PCT Filed: Sep. 8, 2003

(86) PCT No.: PCT/JP03/11431

§ 371 (c)(1),
(2), (4) Date: Mar. 18, 2005

(87) PCT Pub. No.: WO2004/026551

PCT Pub. Date: Apr. 1, 2004

(65) Prior Publication Data

US 2005/0226694 A1  Oct. 13, 2005

(30) Foreign Application Priority Data

Sep. 20, 2002  (JP) .............................. 2002-275429

(51) Int. Cl.
*B28D 1/14* (2006.01)

(52) U.S. Cl. .................... 408/204; 408/57; 279/20; 279/157

(58) Field of Classification Search .................. 408/56, 408/57, 59, 204, 207, 703; 279/20, 157
See application file for complete search history.

(56) References Cited

U.S. PATENT DOCUMENTS

| | | | | | |
|---|---|---|---|---|---|
| 2,084,686 | A | * | 6/1937 | Howard | 173/188 |
| 2,933,321 | A | * | 4/1960 | Cascone | 279/20 |
| 3,003,493 | A | * | 10/1961 | Miller | 408/59 |
| 3,024,030 | A | * | 3/1962 | Koch | 279/20 |
| 3,264,906 | A | * | 8/1966 | Swords | 408/12 |
| RE26,452 | E | * | 9/1968 | Dearborn | 408/226 |
| RE26,623 | E | * | 7/1969 | Erikson | 409/136 |
| 3,817,648 | A | * | 6/1974 | Miller | 408/59 |
| 3,905,609 | A | * | 9/1975 | Sussman | 279/20 |
| 3,985,367 | A | * | 10/1976 | Martino et al. | 279/20 |
| 4,080,090 | A | * | 3/1978 | Kern | 408/59 |
| 4,164,879 | A | * | 8/1979 | Martin | 82/158 |
| 6,176,655 | B1 | | 1/2001 | Ostermeier et al. | |
| 6,926,478 | B2 | * | 8/2005 | Sugata et al. | 409/136 |

FOREIGN PATENT DOCUMENTS

| | | | |
|---|---|---|---|
| DE | 3314719 A1 | * | 10/1984 |
| GB | 2094189 A | * | 9/1982 |
| JP | 55-1745 | | 2/1980 |
| JP | 7-190271 | | 7/1995 |
| JP | 11-270442 | | 10/1999 |
| JP | 11-309710 | | 11/1999 |
| JP | 2002-31280 | | 1/2002 |
| JP | 2002-75586 | | 3/2002 |

* cited by examiner

*Primary Examiner*—Monica Carter
*Assistant Examiner*—J Williams
(74) *Attorney, Agent, or Firm*—Morgan, Lewis & Bockiuss LLP

(57) ABSTRACT

In a core bit formed with a boring blade at a front end thereof and integrally formed with a mounting portion, at a rear end portion thereof, formed with a guide portion in a cylindrical shape mounted to a chuck portion formed at a concrete drill, a ring-like seal member forming a seal between the mounting portion and a side of the chuck portion is formed at the guide portion in the cylindrical shape of the core bit.

3 Claims, 11 Drawing Sheets

US 7,241,087 B2

CORE BIT

TECHNICAL FIELD

The present invention relates to a core bit attached to a concrete drill driven by power of electric power, compressed air or the like and rotated by a rotational force from a side of the concrete drill for boring a concrete wall, a stone member or the like.

BACKGROUND ART

In carrying out a piping construction for a gas supply, a water supply or an air-conditioner at a wall face, a floor face, a foundation or the like of a building formed by concrete, the wall face or the like is bored by using a concrete drill driven by power of electric power, compressed air or the like. A hole having a predetermined diameter is bored at a concrete wall or the like by a boring blade in a cylindrical shape formed at a front end of a core bit by applying rotation and vibration from a side of a concrete drill to the core bit attached to a chuck portion formed at a front end of the concrete drill. The core bit is formed in a hollow shape, and the boring blade is cooled by supplying cooling water from a side of the concrete drill to the boring blade by way of the hollow inside. Further, a seal is formed between the concrete drill and the core bit, so that the cooling water is not leaked when the core bit is attached.

As described in, for example, JP-A-11-309710 (page 3, FIG. 3), a core bit of a background art comprises a supporting member in a hollow shape having a boring blade at a front end of a drill portion at one end side of the supporting member and having a guide portion in a cylindrical shape at the other end side of the supporting member. The core bit is attached to a concrete drill by inserting the guide portion in the cylindrical shape into a cylindrical inside formed at a chuck portion of the concrete drill. By a contact between an end face of the guide portion in the cylindrical shape of the core bit and a seal member arranged at a deepest portion of a cylindrical portion of the chuck portion of the concrete drill, a center opening of the concrete drill and a center opening of the core bit are connected to seal so that the cooling water is flowed from a side of the concrete drill to a side of the core bit.

Meanwhile, the seal member formed between the core bit and the concrete drill is formed by rubber and therefore, when the seal member is deteriorated by elapse of time and water is leaked by deteriorating a seal function by wear of a surface thereof or the like by frequently using the seal member, the seal member needs to be replaced. However, according to a structure of sealing the core bit and the concrete drill of the background art, the seal member is formed at the deepest portion of the guide portion in the cylindrical shape of the chuck portion of the concrete drill and therefore, there poses a problem that a replacing operation becomes extremely complicated.

Further, when the seal member is formed on the side of the chuck of the concrete drill as in the background art, a durability in conformity with a durability of the concrete drill is required for the seal member, and an expensive material of rubber or the like which is difficult to be deteriorated is used to constitute a factor of increasing cost of the concrete drill.

DISCLOSURE OF THE INVENTION

In order to resolve the above-described problem of the background art, it is an object of the invention to provide a core bit for reducing a cost of a concrete drill, capable of using an inexpensive material for a seal member having a service life with substantially the same length as a service life of the core bit, and capable of preventing a failure in sealing between the core bit and the concrete drill without increasing price of the core bit.

In order to achieve the object, the invention is characterized in that in a core bit formed with a boring blade at a front end thereof and formed with a mounting portion in a cylindrical shape mounted to a chuck portion formed at a concrete drill on a rear end side, a ring-like seal member forming a seal between the mounting portion and a side of the chuck portion is formed at a guide portion in a cylindrical shape of the core bit.

Further, the invention is characterized in that the ring-like seal member is formed by a ring-like seal member contained in a stepped portion formed at an inner peripheral face of an end portion of the mounting portion in the cylindrical shape, and the ring-like seal member is held in the stepped portion by engaging a projection formed at the stepped portion with a recess groove formed at an inner peripheral face of the ring-like seal member.

Further, the invention is characterized in that the ring-like seal member is formed by a ring-like seal member contained in a stepped portion formed at an outer peripheral face of an end portion of the mounting portion in the cylindrical shape and the ring-like seal member is held in the stepped portion by engaging a projection formed at the stepped portion with a recess groove formed at an inner peripheral face of the ring-like seal member.

Figure 1:
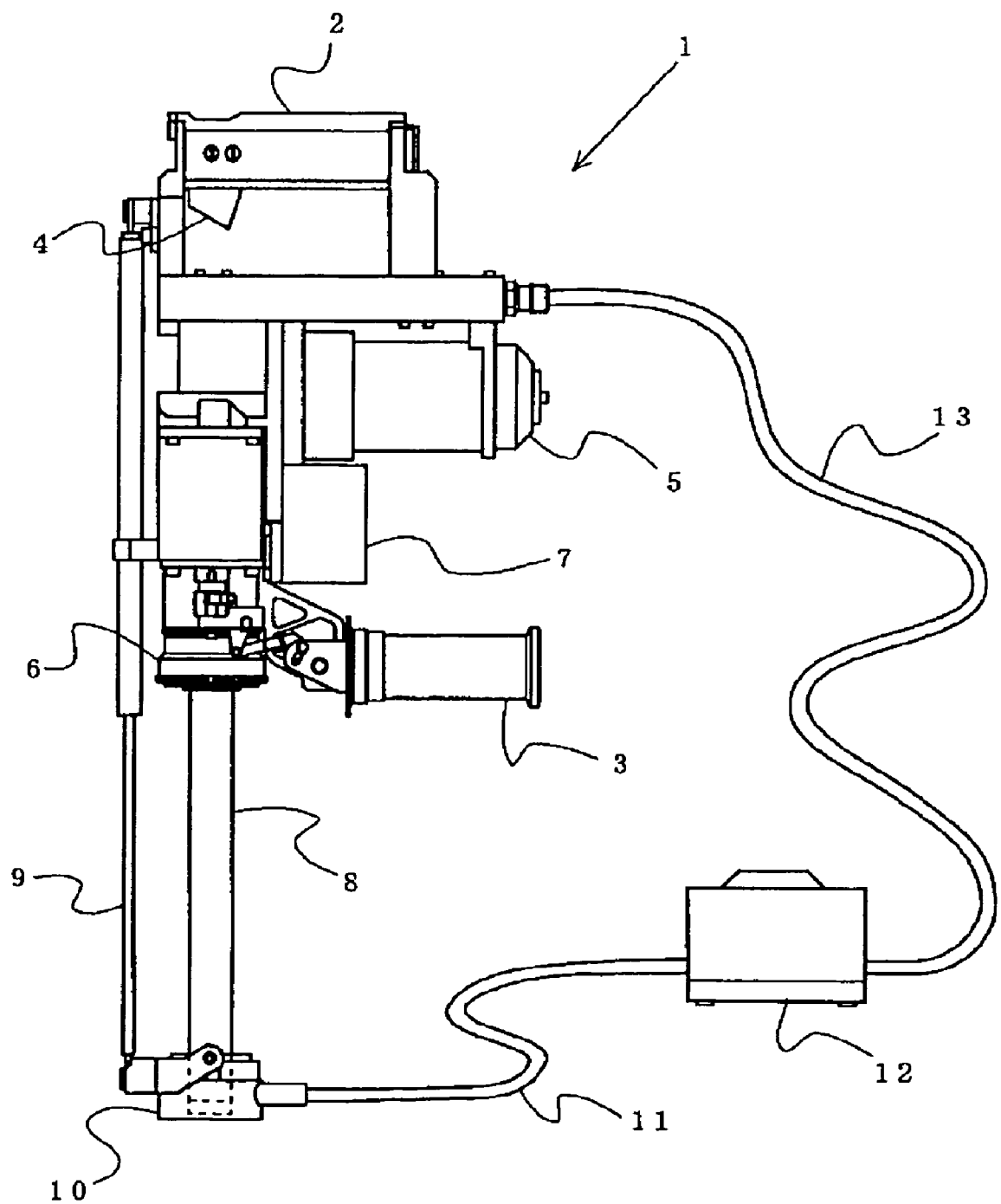
FIG. 1 is a side view of a concrete drill mounted with a core bit according to respective embodiments of the invention.

Further, in notations in the drawings, numeral 1 designates a concrete drill, numeral 6 designates a chuck portion, numeral 8 designates a core bit, numeral 10 designates a guide member, numeral 14 designates a boring blade, numeral 15 designates a drill portion, numeral 16 designates a mounting portion, numeral 17 designates a guide portion, numeral 18 designates a flange portion, numeral 19 designates an engaging projection, numeral 20 designates a stepped portion, numeral 21 designates a ring-like seal member, numeral 22 designates a projection, numeral 23 designates a ring-like groove, numeral 24 designates an inclined face, numeral 25 designates a lock claw member, numeral 26 designates a stepped portion, numeral 27 designates a ring-like seal member, numeral 28 designates a projection, numeral 29 designates a ring-like groove, numeral 30 designates a ring-like groove, numeral 31 designates a ring-like seal member, numeral 32 designates a ring-like groove, numeral 33 designates a ring-like seal member, and numeral 34 designates a ring-like seal member.

BEST MODE FOR CARRYING OUT THE INVENTION

An explanation will be given of a mode for carrying out the invention based on embodiments shown in the drawings as follows.

FIRST EMBODIMENT

FIG. 1 shows the concrete drill 1 mounted with a core bit according to respective embodiments of the invention. The concrete drill is constituted to be able to carry out boring operation by grabbing a grip 2 formed at a rear end of a main body and an auxiliary grip 3 formed frontward from the main body by the both hands. By operating a trigger 4 formed at the grip 2, a motor 5 is driven to rotate to rotate the chuck portion 6 formed at a front end portion thereof to drive to rotate the core bit 8 mounted to the chuck portion 6. Further, simultaneously therewith, a vibration generating mechanism 7 is driven to vibrate a total of the concrete drill 1 to provide vibration along an axial direction to the core bit 8.

A front end side of the core bit 8 mounted to the chuck portion 6 of the concrete drill 1 is held by the guide member 10 supported by a rod 9 extractable and contractable to and from a front side of the concrete drill 1. In boring, a cooling water for cooling the front end portion of the core bit 8 is supplied from a side of the concrete drill 1 to the front end portion of the core bit 8 by way of an opening formed at a center of the core bit 8, and the cooling water supplied to the front end portion of the core bit 8 is circulated by being recovered to a filtering apparatus 12 or the like via a hose 11 connected to the guide member arranged to cover a face to be bored of a concrete wall face or the like to return again to the concrete drill 1 by a hose 13 after removing a cut powder or the like of concrete by the filtering apparatus 12 or the like.

Figure 2:
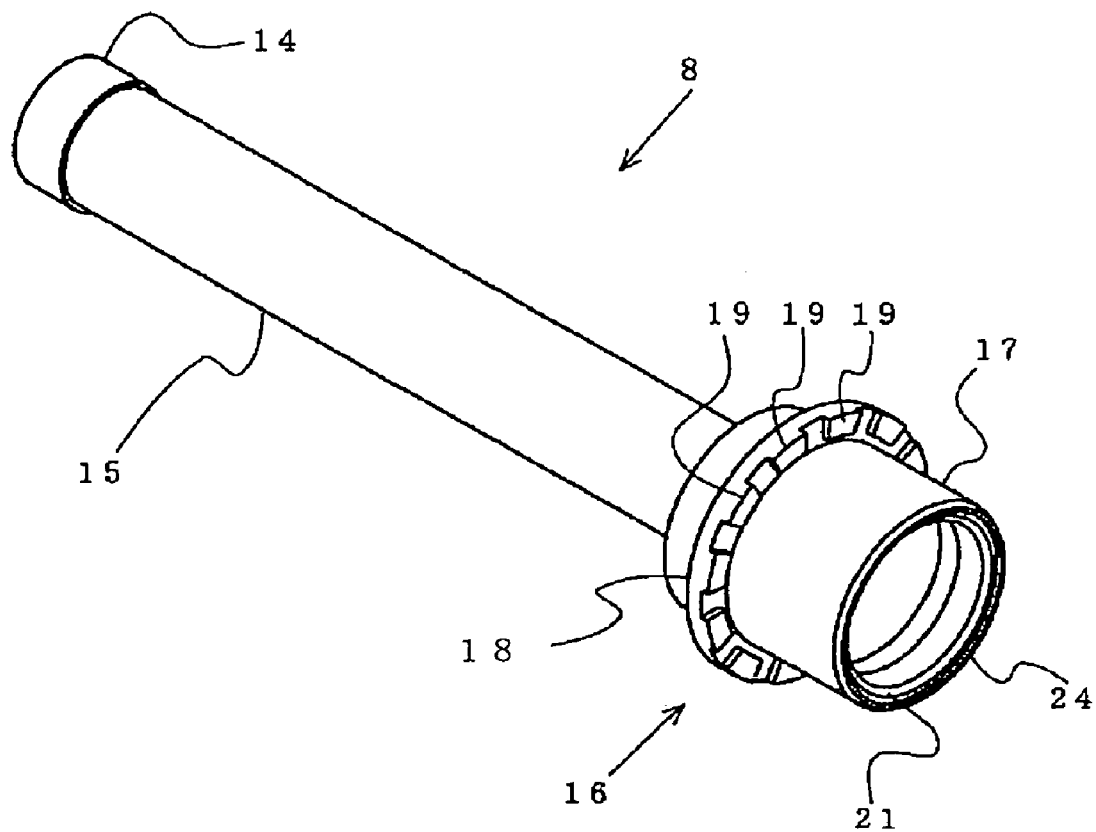
FIG. 2 is a perspective view showing a core bit according to a first embodiment of the invention.
Figure 3:
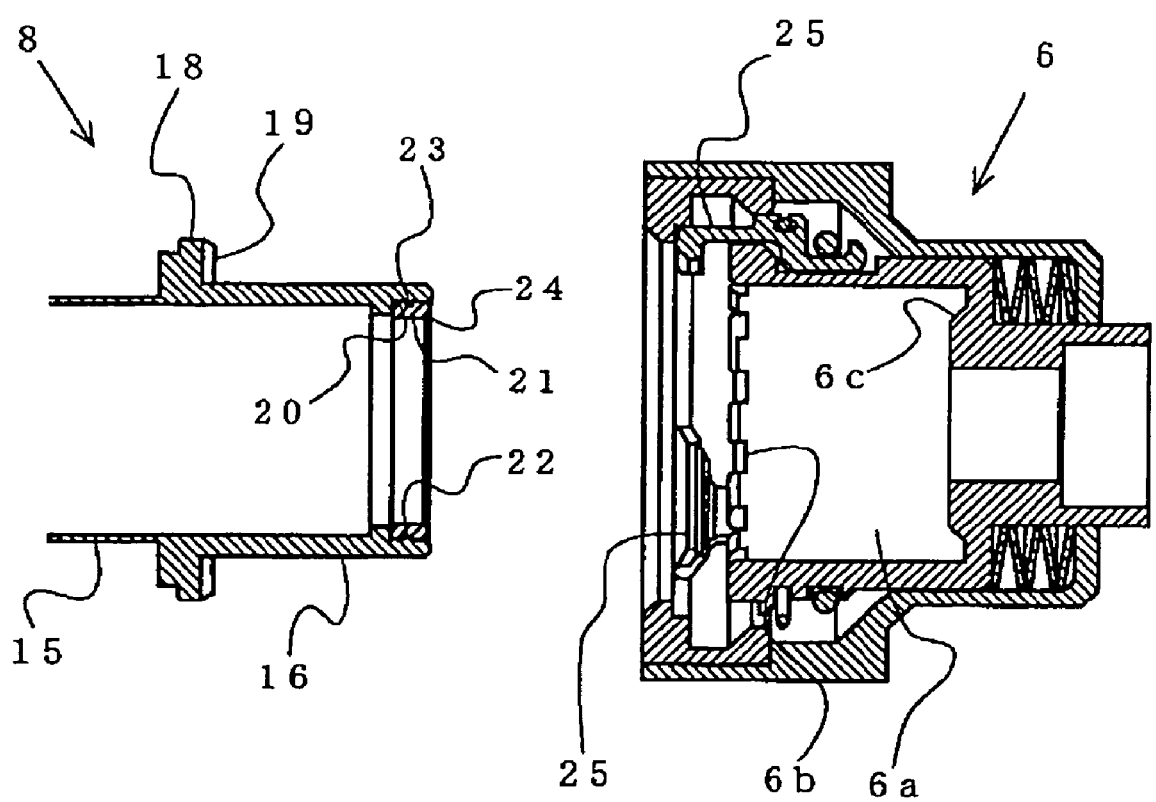
FIG. 3 is a sectional view of the core bit according to the first embodiment of the invention and a chuck portion.
Figure 4:
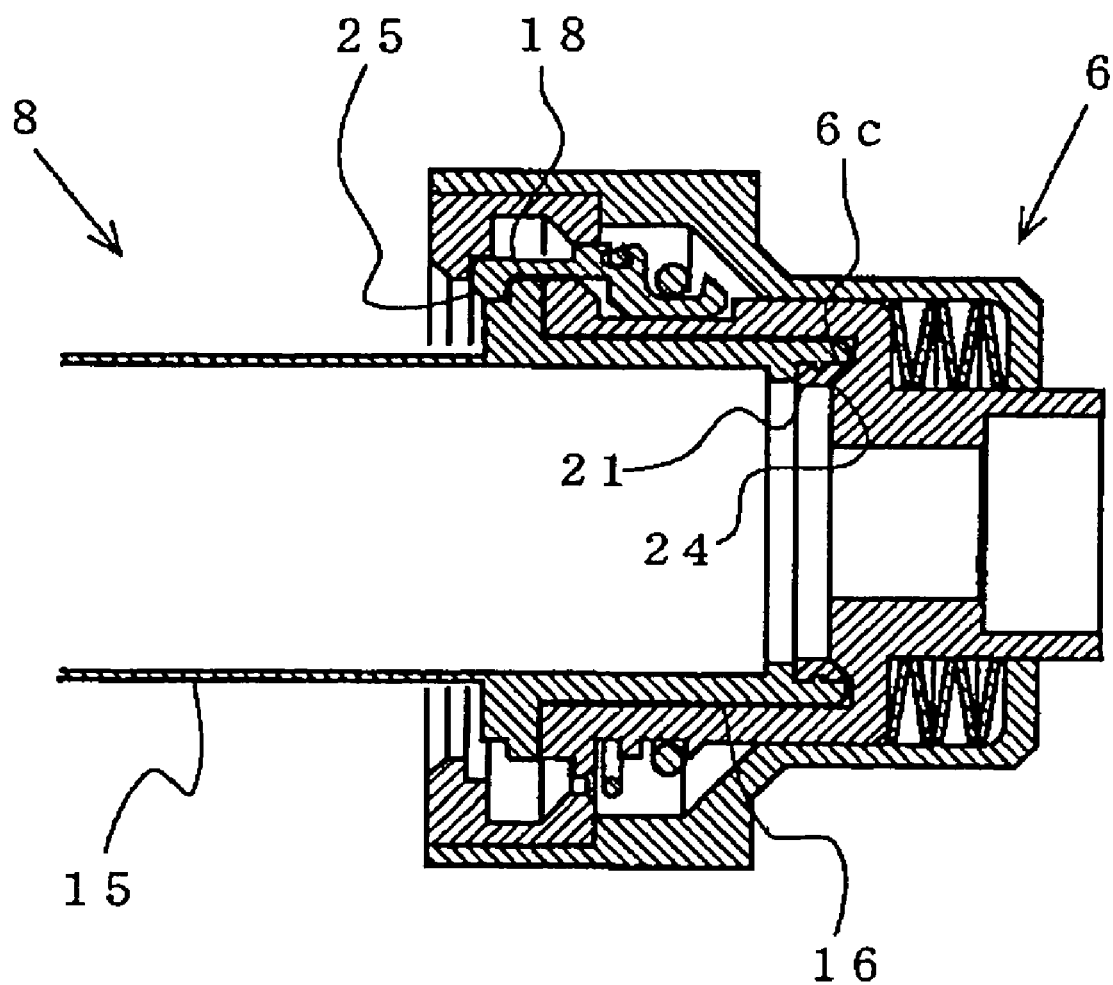
FIG. 4 is a sectional view of a state of mounting the core bit according to the first embodiment of the invention to the chuck portion.

FIG. 2 through FIG. 4 show the core bit according to the first embodiment of the invention. As shown by FIG. 2, the core bit 8 is constituted by the drill portion 15 in a shape of a hollow cylinder formed with the boring blade 14 in a cylindrical shape at a front end portion thereof, and the mounting portion 16 in a shape of a hollow cylinder formed at other end side of the drill portion 15, and the drill portion 15 is formed in a dimension and a shape which differ respectively in correspondence with a diameter and a depth of a hole to be bored. An end portion of the mounting portion 16 is formed with the guide portion 17 in a cylindrical shape and by mounting the guide portion 17 in the cylindrical shape into a cylindrical portion 6a formed at the chuck portion 6 of the concrete drill 1, a rotational axis of the concrete drill 1 and a center axis of the core bit 8 are guided to coincide with each other.

An outer peripheral face of the guide portion 17 in the cylindrical shape remote from an end portion of the mounting portion 16 in a direction of the boring blade 14 is formed with the flange portion 18 in a ring-like shape having an outer diameter larger than an outer diameter of the guide portion 17, and a side face facing other end side of the flange portion 18 in the ring-like shape is formed with the engaging projection 19 for transmitting rotation of the chuck portion 6 of the concrete drill 1 to the core bit 8. A plurality of the engaging projections 19 are formed at the side face of the flange portion 18 to project to direct in a direction of other end side thereof at equal intervals along a circumferential direction, and by engaging the engaging projections 19 with engaging recess portions 6b formed at an end face of the cylindrical portion 6a of the chuck portion 6 of the concrete drill 1 as shown by FIG. 3 and FIG. 4, rotation on a side of the concrete drill 1 is transmitted to the core bit 8.

As shown by FIG. 2 and FIG. 3, an inner peripheral face of the mounting portion 16 of the core bit 8 on a side of an end portion of the guide portion 17 is formed with the stepped portion 20 an inner diameter of which is enlarged to direct in a direction of an end face of the guide portion 17, and the stepped portion 20 is arranged with the seal member 21 made of rubber formed in a ring-like shape. Whereas an inner peripheral face a diameter of which is enlarged and formed with the stepped portion 20 is formed with the projection 22 projected to direct in a direction of a center, an outer peripheral face of the ring-like seal member 21 is formed with the ring-like groove 23 capable of containing the projection 22, and by fitting the projection 22 into the ring-like groove 23 of the ring-like seal member 21 arranged at the stepped portion 20, the ring-like seal member 21 is attached into the stepped portion 20.

A side of an inner periphery of an end face of the ring-like seal member 21 is formed with the inclined face 24 to correspond to an inclined seat face 6c formed at the deepest portion of the cylindrical portion 6a of the chuck portion 6 of the concrete drill 1, in mounting the core bit 8 to the concrete drill 1, by inserting the guide portion 17 of the core bit 8 into the cylindrical portion 6a of the chuck portion 6, as shown by FIG. 4, the inclined face 24 of the ring-like seal member 21 is brought into close contact with the seal seat face 6c formed at the deep portion of the cylindrical portion 6a to connect to seal inside of the cylindrical portion 6a of the chuck portion 6 and an inner portion of the core bit 8. Thereby, cooling water supplied from inside of the cylindrical portion of the concrete drill 1 is supplied to the hollow inside of the core bit 8 without being leaked. By engaging the lock claw member 25 provided at the chuck portion 6 of the concrete drill 1 with an outer peripheral edge of the flange portion 18 of the core bit 8, the core bit 8 is integrally coupled with the concrete drill 1 in a state of being mounted to the chuck portion 6 of the concrete drill 1.

The end face of the ring-like seal member 21 arranged at the stepped portion 20 is formed not to be projected from the end face of the ring-like portion forming the guide portion 17 of the mounting portion 16 and by constituting in this way, in removing concrete remaining at inside of the core bit 8 from inside of the core bit 8, when the concrete strikes the rear end portion of the core bit 8, the ring-like seal member 21 can be prevented from being damaged by being struck.

SECOND EMBODIMENT

Figure 5:
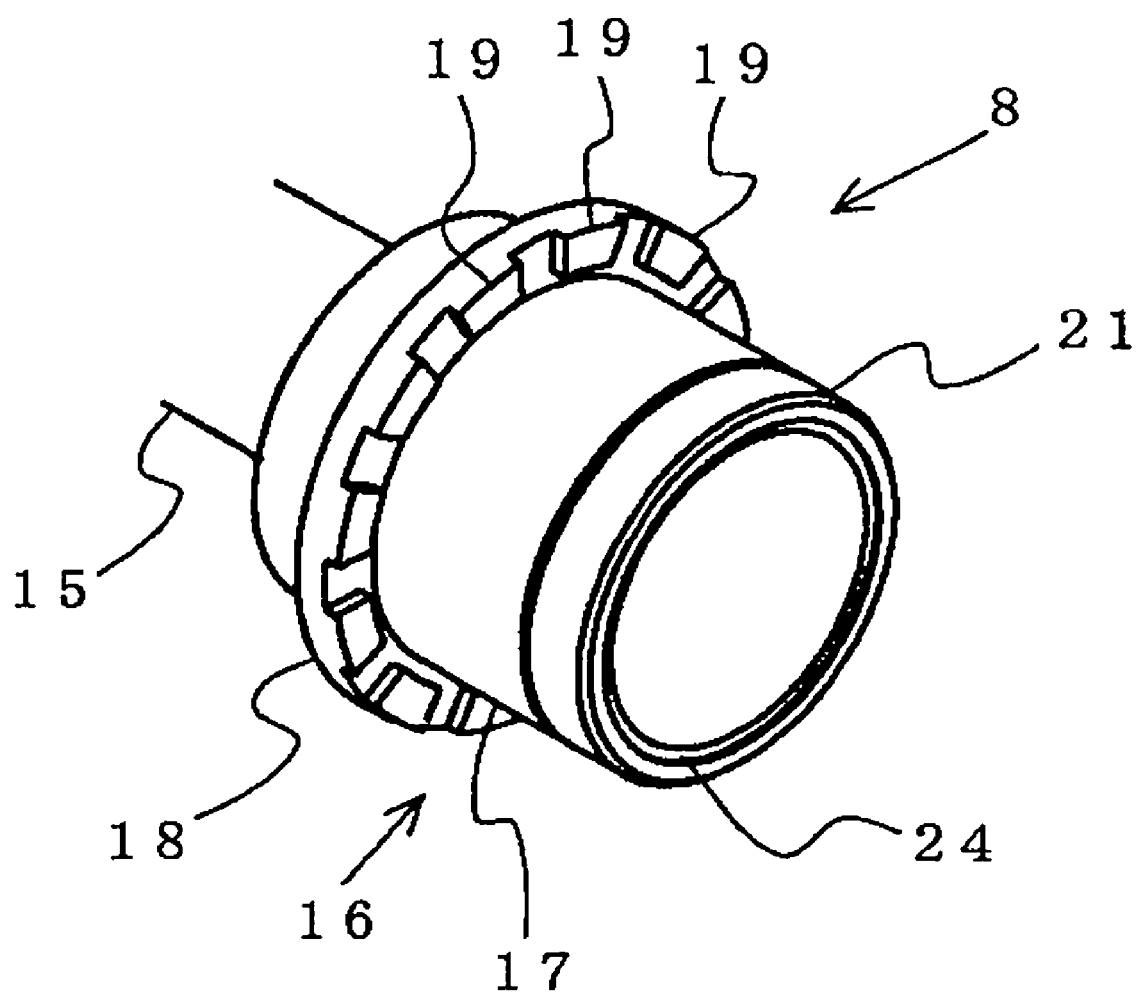
FIG. 5 is a sectional view of a core bit according to a second embodiment of the invention and a chuck portion.
Figure 6:
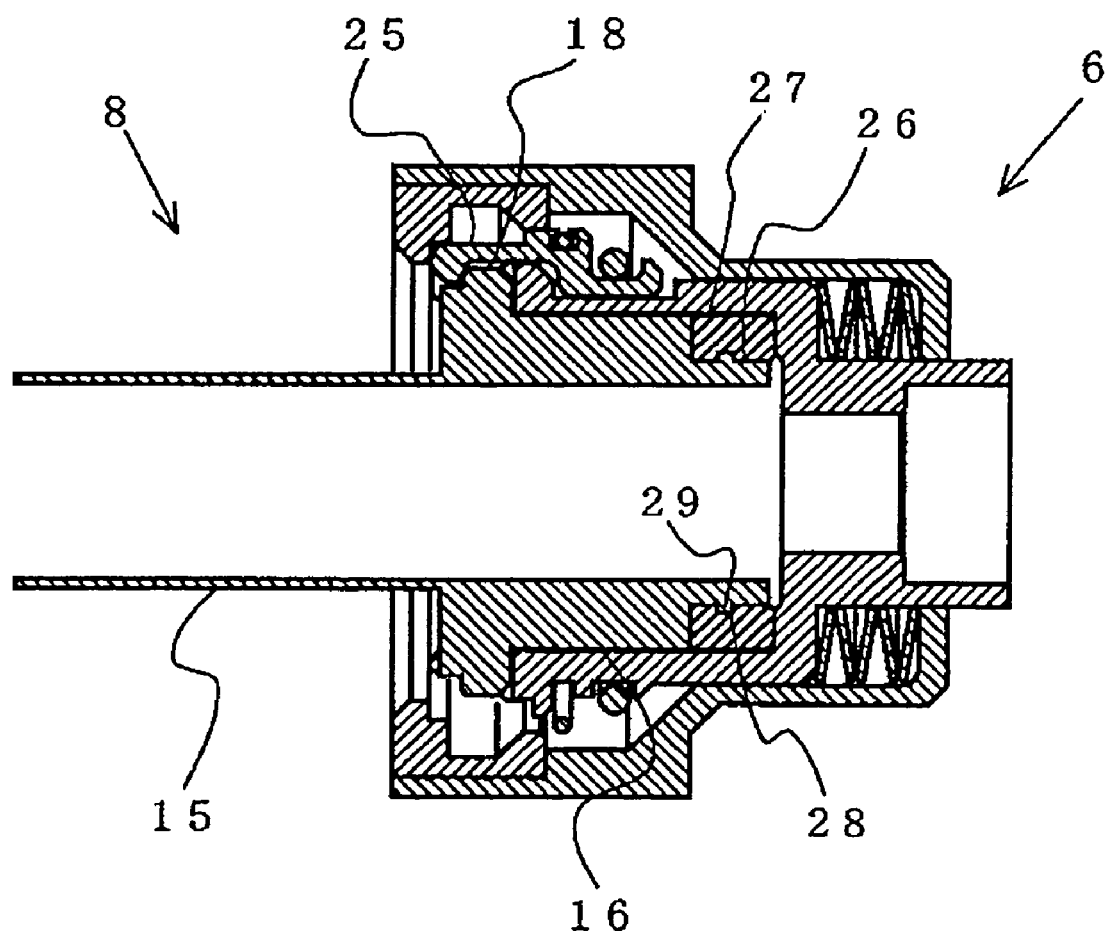
FIG. 6 is a sectional view of a state of mounting the core bit according to the second embodiment of the invention to the chuck portion.

FIG. 5 and FIG. 6 show a second embodiment of the invention, as shown by FIG. 5, the core bit 8 according to the embodiment is formed with the stepped portion 26 an outer diameter of which is contracted at an outer peripheral face of an end portion of the guide portion 17 in the cylindrical shape formed at the mounting portion 16 and the stepped portion 26 is mounted with the ring-like seal member 27. An outer peripheral face of the stepped portion 26 is formed with the projection 28 projected in an outer diameter direction, and by engaging the projection 28 with the ring-like groove 29 formed at an inner peripheral face of the ring-like seal member 27, the ring-like seal member 27 is locked in the stepped portion 26 of the guide portion 17.

An end face of the ring-like seal member 27 of the embodiment is formed to project from an end face of a ring-like portion forming the guide portion 17 of the mounting portion 16, and the end face of the guide portion 17 in the cylindrical shape and an outer peripheral face thereof proximate to the end face can be protected by the ring-like seal member 27 against deformation thereof when the core bit 8 is dropped or the like.

THIRD EMBODIMENT

Figure 7:
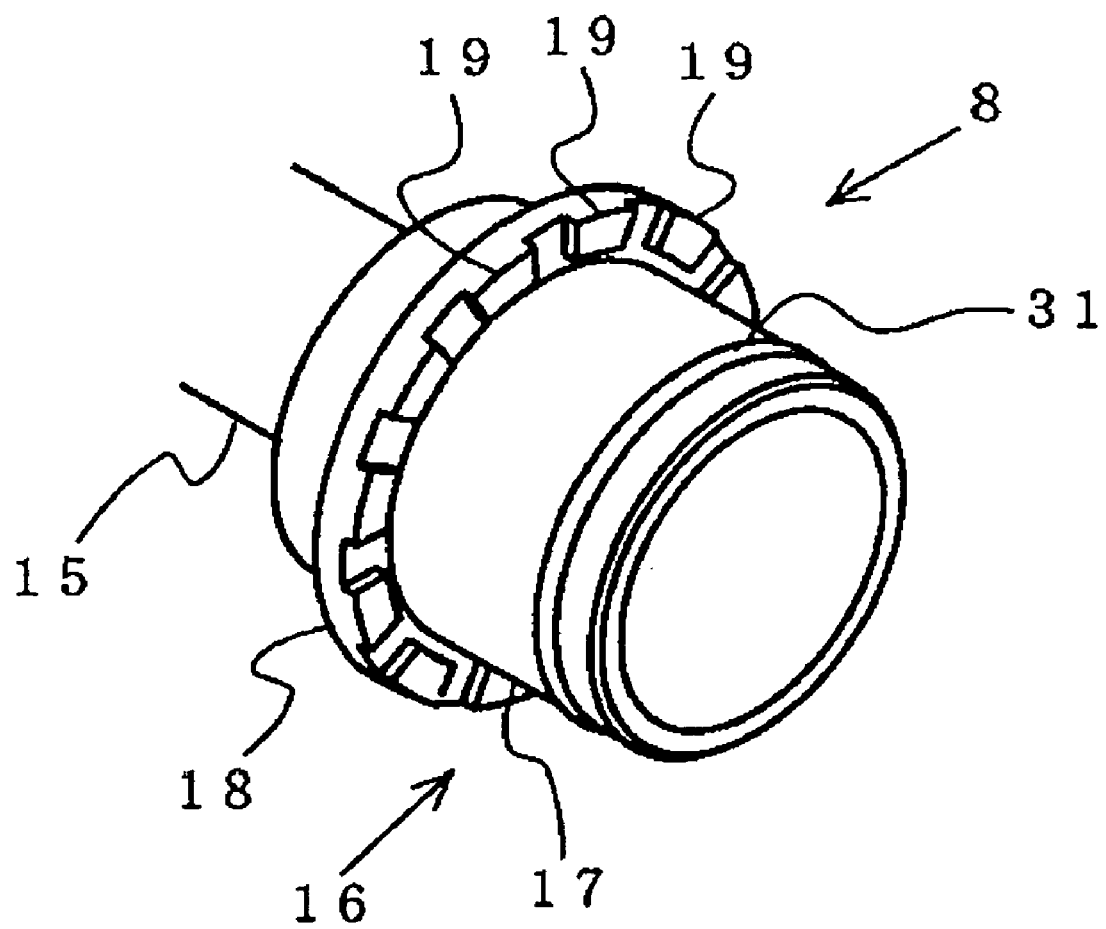
FIG. 7 is a sectional view of a core bit according to a third embodiment of the invention and a chuck portion.
Figure 8:
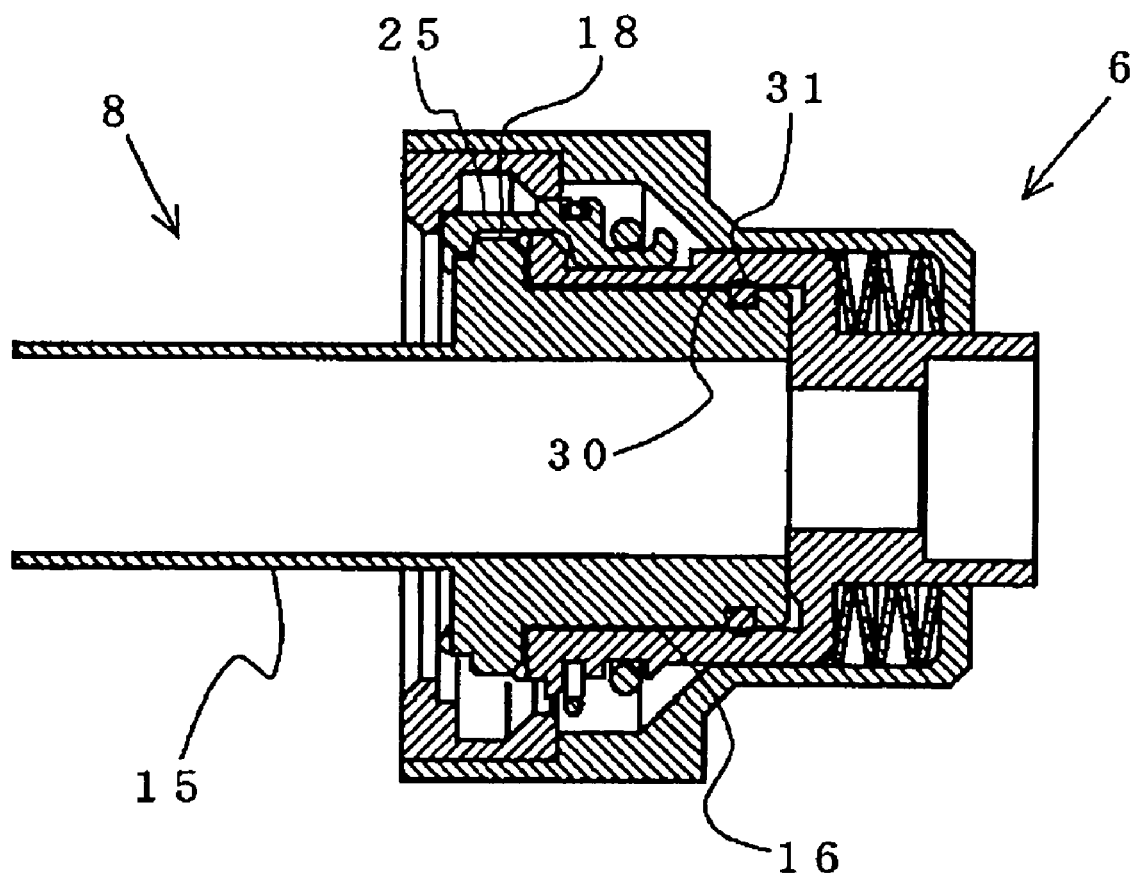
FIG. 8 is a sectional view of a state of mounting the core bit according to the third embodiment of the invention to the chuck portion.

The core bit 8 according to the third embodiment shown in FIG. 7 and FIG. 8 is formed with the ring-like groove 30 at an outer peripheral face proximate to an end portion of the guide portion 17 in the cylindrical shape formed at the mounting portion 16 and the ring-like seal member 31 of an O-ring or the like is arranged at inside of the ring-like groove. As shown by FIG. 8, the ring-like seal member 31 formed at the outer peripheral face of the guide portion 17 in this way is brought into close contact with the inner peripheral face of the cylindrical portion 6a of the chuck portion 6 to connect inside of the cylindrical portion 6a of the chuck portion 6 and inside of the core bit 8 to seal.

FOURTH EMBODIMENT

Figure 9:
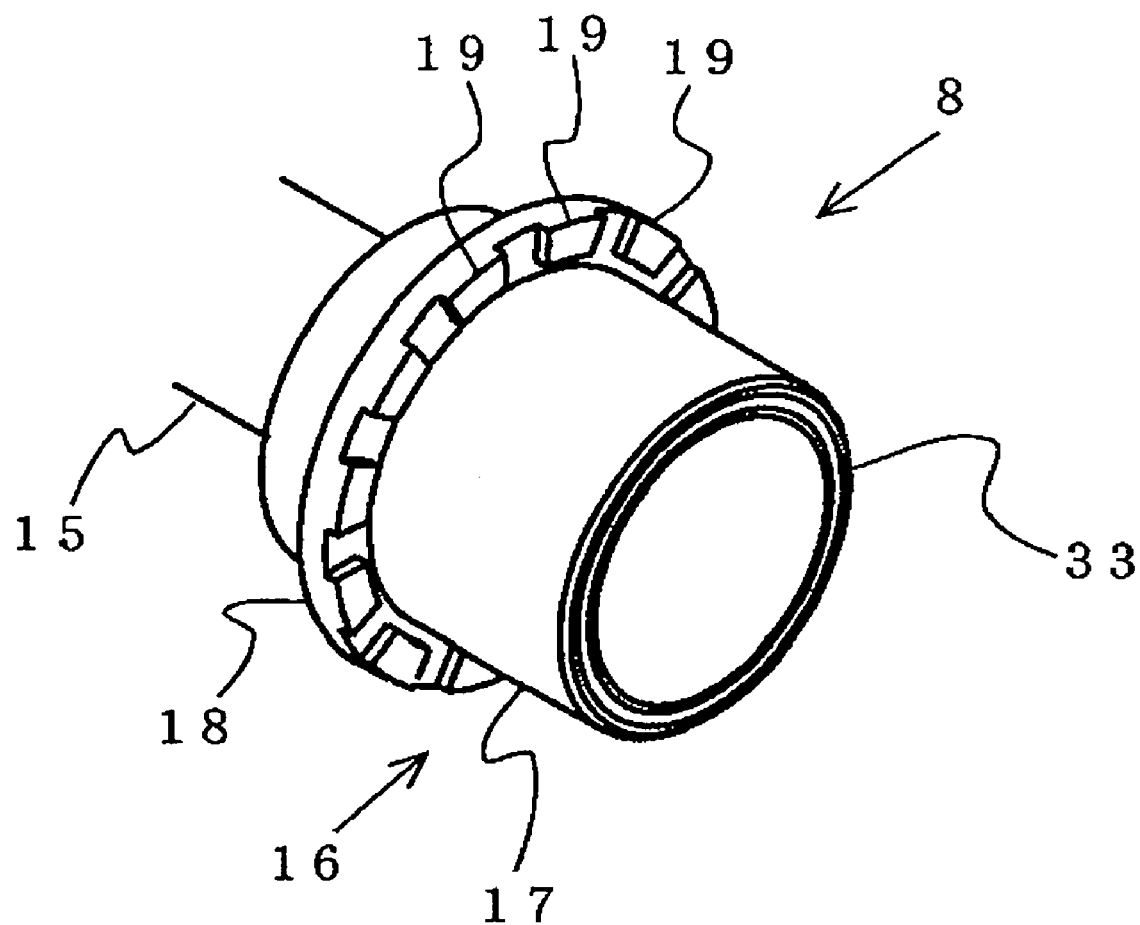
FIG. 9 is a sectional view of a core bit according to a fourth embodiment of the invention and a chuck portion.
Figure 10:
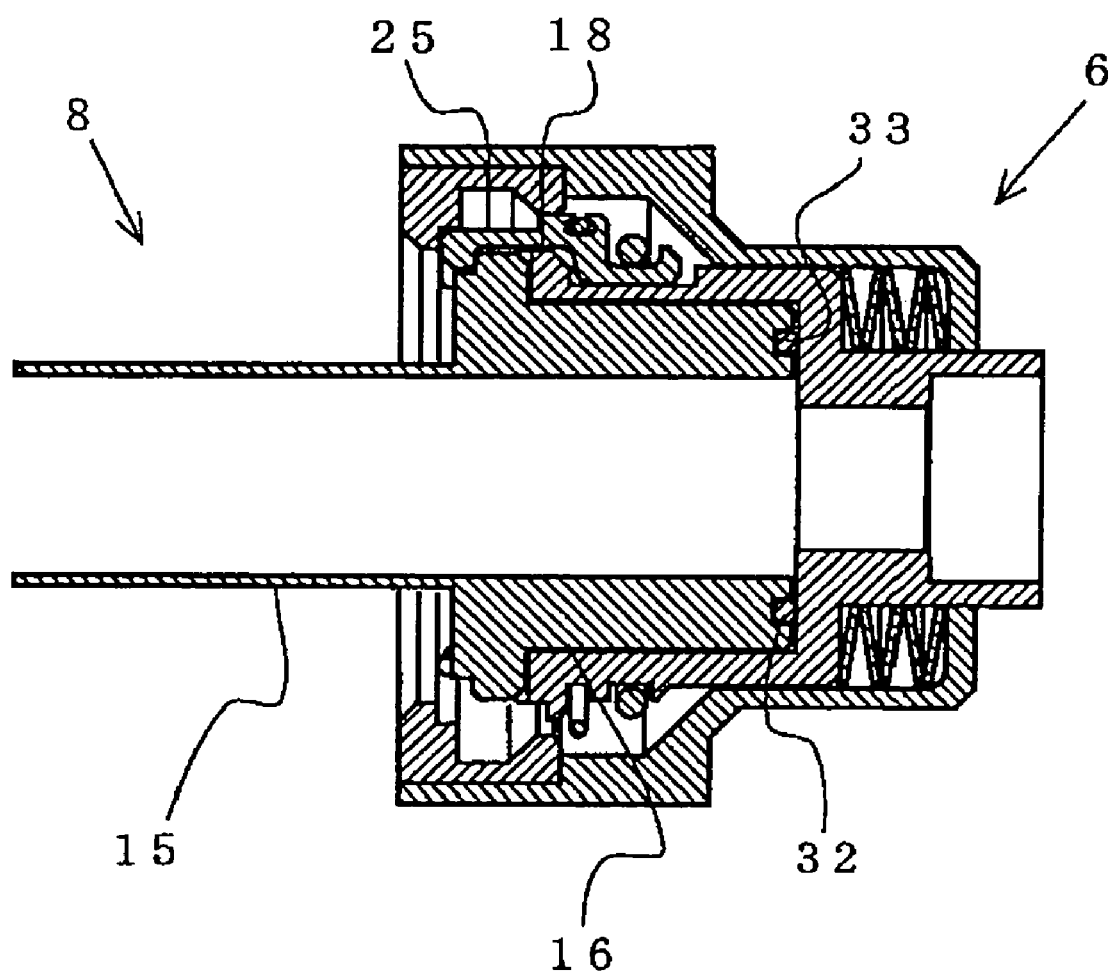
FIG. 10 is a sectional view of a state of mounting the core bit according to the fourth embodiment of the invention to the chuck portion.

Further, the core bit 8 according to a fourth embodiment shown in FIG. 9 and FIG. 10 is formed with the ring-like seal groove 32 at an end face of the guide portion 17 in the cylindrical shape formed at the mounting portion 16 and the ring-like seal member 33 of an O-ring or the like is arranged at inside of the ring-like groove 32. As shown by FIG. 10, the ring-like seal member 33 formed at the end face of the guide portion 17 is brought into close contact with an end face of the deepest portion of the cylindrical portion 6a of the chuck portion 6 to connect inside of the cylindrical portion 6a of the chuck portion 6 and inside of the core bit 8 to seal.

FIFTH EMBODIMENT

Figure 11:
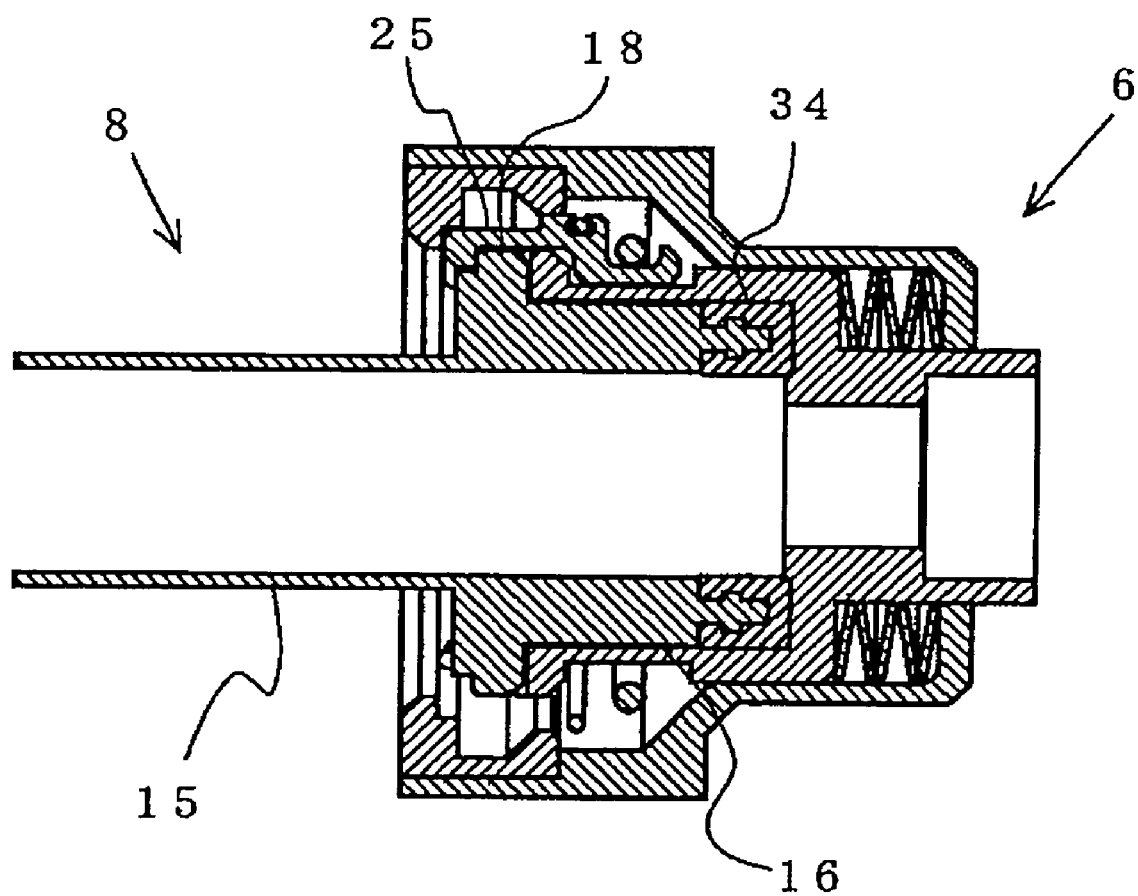
FIG. 11 is a sectional view of a state of mounting a core bit according to a fifth embodiment of the invention to a chuck portion.

Further, as in a fifth embodiment shown in FIG. 11, there may be constructed a constitution in which the ring-like seal member 34 is integrally formed to cover the end face of the guide portion 17 in the cylindrical shape of the core bit 8 and an inner peripheral face and an outer peripheral face of a cylinder continuous to the end face.

According to the embodiment, stepped portions are formed at the inner peripheral face and the outer peripheral face of the end portion of the guide portion 17, the stepped portion on a side of the outer peripheral face is formed with a projection projected in an outer diameter direction and the stepped portion on a side of the inner peripheral face is formed with a projection projected in a direction of a center thereof. On the other hand, the ring-like seal member 34 is formed with ring-like grooves respectively at positions in correspondence with the projections. By engaging the two projections and the two ring-like grooves, the ring-like seal member 34 is locked by the guide portion 17.

INDUSTRIAL APPLICABILITY

As described above, according to the invention described in claim 1, in the core bit formed with the mounting portion provided with the guide portion in the cylindrical shape mounted to the chuck portion of the concrete drill, the ring-like seal member for forming the seal between the mounting portion and a side of the chuck portion is formed at the guide portion of the mounting portion of the core bit and therefore, it is not necessary to form an expensive seal member on the side of the chuck portion of the concrete drill and cost of the concrete drill can be reduced, further, the ring-like seal member is formed on the side of the core bit and therefore, it is not necessary to take a consideration of durability thereof so much and an inexpensive seal member can be adopted, further, when the ring-like seal member is destructed, the ring-like seal member can easily be replaced.

Further, the ring-like seal member is provided at the stepped portion formed at the inner peripheral face of the end portion of the guide portion formed in the cylindrical shape of the mounting portion of the core bit and therefore, when the rear end portion of the core bit is struck in removing concrete core remaining at inside of the core bit, the ring-like seal member can be prevented from being damaged by the striking.

Further, when the ring-like seal member is provided at the stepped portion formed at the outer peripheral face of the end portion of the guide portion formed in the cylindrical shape of the mounting portion of the core bit, when the core bit is dropped or the like, deformation of the end face of the guide portion in the cylindrical shape and the outer peripheral face proximate to the end face can be protected by the ring-like seal member.

The invention claimed is:

1. A core bit for a concrete drill comprising:
a drill portion in a cylindrical shape;
a boring blade formed at one end side of the drill portion;
a mounting portion formed at the other end side of the drill portion and including a guide portion in a cylindrical shape; and
a ring-shaped seal member provided at the guide portion for forming a seal between the guide portion and a side of a chuck portion of the concrete drill,
wherein the ring-shaped seal member is contained in a stepped portion formed at an inner peripheral face of an end portion of the guide portion, and
the ring-shaped seal member is held at the stepped portion by engaging a projection formed to project from an inner peripheral face of the stepped portion in a direction of a center thereof and a ring-shaped groove formed at an outer peripheral face of the ring-shaped seal member.

2. A core bit for a concrete drill comprising:
a drill portion in a cylindrical shape;
a boring blade formed at one end side of the drill portion;

a mounting portion formed at the other end side of the drill portion and including a guide portion in a cylindrical shape; and a ring-shaped seal member provided at the guide portion for forming a seal between the guide portion and a side of a chuck portion of the concrete drill, wherein the ring-shaped seal member is contained in a stepped portion formed at an outer peripheral face of an end portion of the guide portion; and the ring-shaped seal member is held in the stepped portion by engaging a projection formed to project from an outer peripheral face of the stepped portion in an outer diameter direction and a ring-shaped groove formed at an inner peripheral face of the ring-shaped seal member.

3. A core bit for a concrete drill comprising:

a drill portion in a cylindrical shape;

a boring blade formed at one end side of the drill portion;

a mounting portion formed at the other end side of the drill portion and including a guide portion in a cylindrical shape; and a ring-shaped seal member provided at the guide portion for forming a seal between the guide portion and a side of a chuck portion of the concrete drill, wherein the ring-shaped seal member is integrally formed to cover an end face of the guide portion and an inner peripheral face and an outer peripheral face of a cylinder continuous to the end face of the guide portion.

* * * * *